United States Patent
Tagome et al.

(10) Patent No.: US 6,919,662 B2
(45) Date of Patent: Jul. 19, 2005

(54) MOTOR

(75) Inventors: Masaki Tagome, Hirakata (JP); Yasuhiro Kondo, Hirakata (JP); Naoyuki Kadoya, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 167 days.

(21) Appl. No.: 10/131,323

(22) Filed: Apr. 25, 2002

(65) Prior Publication Data

US 2002/0175585 A1 Nov. 28, 2002

(30) Foreign Application Priority Data

Apr. 25, 2001 (JP) .................................... 2001-128113
Feb. 27, 2002 (JP) .................................... 2002-051069

(51) Int. Cl.⁷ .............................................. H20K 21/12
(52) U.S. Cl. ........................... 310/156.53; 310/156.54; 310/156.55; 310/156.56; 310/156.57
(58) Field of Search ...................... 310/156.53, 156.54, 310/156.55, 156.56, 156.57, 156

(56) References Cited

U.S. PATENT DOCUMENTS

| | | | |
|---|---|---|---|
| 4,566,855 A | 1/1986 | Costabile et al. | |
| 4,782,257 A | 11/1988 | Secher et al. | |
| 4,795,936 A | 1/1989 | Crosetto et al. | |
| 5,990,593 A | 11/1999 | Narita et al. | |
| 6,329,734 B1 | 12/2001 | Takahashi et al. | |
| 6,462,430 B1 | 10/2002 | Joong et al. | |

FOREIGN PATENT DOCUMENTS

| | | |
|---|---|---|
| EP | 0642209 | 3/1995 |
| EP | 0923186 | 6/1999 |
| EP | 1032115 | 8/2000 |
| JP | 7-59310 | 3/1995 |
| JP | 9-294362 | 11/1997 |
| JP | 11-18339 | 1/1999 |
| JP | 11-136890 | 5/1999 |
| JP | 11-196544 | 7/1999 |
| JP | 2000-50584 | 2/2000 |
| JP | 2000-50584 A  *  2/2000 | .......... H02K/16/02 |
| JP | 2000-175390 | 6/2000 |
| JP | 2000-245123 | 9/2000 |
| JP | 2000-270525 | 9/2000 |
| JP | 2000-287419 | 10/2000 |
| JP | 2000-308286 | 11/2000 |
| JP | 2000-308287 | 11/2000 |
| JP | 2001-69609 | 3/2001 |

OTHER PUBLICATIONS

English Language Abstract of JP 11–18339.
English Language Abstract of JP 2001–69609.
English Language Abstract of JP 200–308286.
English Language Abstract of JP 11–136890.

(Continued)

Primary Examiner—Dang Le
Assistant Examiner—Iraj A. Mohandesi
(74) Attorney, Agent, or Firm—Greenblum & Bernstein, P.L.C.

(57) ABSTRACT

A motor including: a rotor including a permanent magnet type rotor unit having a plurality of permanent magnets and a reluctance type rotor unit having a plurality of salient pole portions, the rotor units being coupled to each other in an axial direction; and a stator for generating a field for driving the rotor. The permanent magnet type rotor unit and the reluctance type rotor unit are given an angle deviation therebetween in the direction of rotation to obtain desired torque characteristics. The reluctance type rotor unit has slits for preventing flux leakage from the permanent magnets. The slits are formed with the angle deviation in the direction of rotation from respective positions symmetric about a center of the salient pole portions. Flux leakage is thus prevented to avoid deterioration in characteristics.

11 Claims, 9 Drawing Sheets

OTHER PUBLICATIONS

English Language Abstract of JP 11–196544.
English Language Abstract of JP 2000–175390.
English Language Abstract of JP 2000–308287.
English Language Abstract of JP 2000–245123.
English Language Abstract of JP 2000–270525.
English Language Abstract of JP 2000–287419.
English Language Abstract of JP 2000–50584.
English Language Abstract of JP 7–59310.
English Language Abstract of JP 9–294362.
English Language Abstract of JP 11–196544.

* cited by examiner

Prior Art

MOTOR

The present disclosure relates to subject matter contained in priority Japanese Patent Application Nos. 2001-128113 and 2002-51069, filed on Apr. 25, 2001 and Feb. 27, 2002 respectively, the contents of which is herein expressly incorporated by reference in its entirety.

BACKGROUND OF THE INVENTION

1. Field of the Invention

The present invention relates to a motor, and more particularly to a motor having a rotor which combines a permanent magnet type rotor unit and a reluctance type rotor unit for the sake of enhanced flexibility in design.

2. Description of Related Art

Conventionally, there have been motors in which a permanent magnet type rotor unit having a plurality of permanent magnets and a reluctance type rotor unit having a plurality of salient pole portions are coupled to each other in the axial direction for the sake of enhanced flexibility in design. The known examples include ones disclosed in Japanese Patent Laid-Open Publications Nos. Hei. 7-59310 and Hei. 9-294362.

Japanese Patent Laid-Open Publication No. Hei. 7-59310 discloses that the permanent magnets and the salient pole portions are given an angle deviation therebetween in the direction of rotation to obtain desired characteristics, and that a nonmagnetic material is interposed into the stator and between opposed portions of the permanent magnet type rotor unit and the reluctance type rotor unit of the rotor so that flux leakage from the permanent magnets to the reluctance type rotor unit is prevented to avoid coupling in terms of magnetic circuits.

In Japanese Patent Laid-Open Publication No. Hei. 9-294362, however, the permanent magnet type rotor unit and the reluctance type unit are simply combined with each other. This causes a problem of inevitable deterioration in characteristics due to interactions. More specifically, the problem is that the magnetic flux from the permanent magnets of the permanent magnet type rotor unit can leak out to the reluctance type rotor unit, ending up with deterioration in characteristics. Moreover, since a current phase value at which the permanent magnet type rotor unit generates a maximum torque is different from one at which the reluctance type rotor unit generates a maximum torque, there is the problem that the combined torque does not reach the sum of the maximum values.

Meanwhile, in Japanese Patent Laid-Open Publication No. Hei. 7-59310, the interposition of the nonmagnetic material between the permanent magnet type rotor unit and the reluctance type rotor unit prevents the flux leakage, whereas there are problems of greater size and higher cost.

Among possible technical means for solving these problems is one disclosed in Japanese Patent Laid-Open Publication No. Hei. 11-196544 in which the reluctance type rotor unit is provided with slits for interrupting magnetic flux from the permanent magnets. Now, an example of such configuration will be described with reference to FIGS. 16A–16C. The reference numeral 1 represents a motor, which includes a rotor 2 and a stator 3. The rotor 2 includes a permanent magnet type rotor unit 4 having 2n (n is a natural number) permanent magnets 5 and a reluctance type rotor unit 6 having a plurality of salient pole portions 7. The rotor units 4 and 6 are coupled to each other in the axial direction. The reluctance type rotor unit 6 has slits 8 for preventing flux leakage from the ends of the permanent magnets 5. The slits 8 are formed symmetrically about the center of the salient pole portions 7 so as to run within projected sections of the permanent magnets 5. The stator 3 is provided with 3n teeth 9. Each of the teeth 9 is-given a winding 10 so as to generate a magnetic field for driving the rotor 2.

Practical experiments showed, however, that even in such configuration, i.e., when the slits 8 were formed to fall within the projected sections of the permanent magnets 5, flux leakage through outside the ends of the slits 8 was considerably greater than expectations. That is, the flux leakage from the ends of the permanent magnets 5 to the reluctance type rotor unit 6 could not be prevented satisfactorily.

Besides, if the permanent magnet type rotor unit 4 and the reluctance type rotor unit 6 are coupled to each other in the axial direction with an angle deviation in the direction of rotation so that the combined characteristics of the torques generated by the permanent magnet type rotor unit 4 and the reluctance type rotor unit 6 become desirable, there may occur the problem that the effect of the slits 8 is insufficient.

SUMMARY OF THE INVENTION

In light of the foregoing conventional problems, an object of the present invention is to provide a motor in which different types of rotor units are coupled to obtain desired torque characteristics and allow the prevention of deterioration in characteristic as well without causing an increase in size and a rise in cost.

A motor according to the present invention includes: a rotor including a permanent magnet type rotor unit having a plurality of permanent magnets and a reluctance type rotor unit having a plurality of salient pole portions, the rotor units being coupled to each other in an axial direction; and a stator for generating a field for driving the rotor. Here, the reluctance type rotor unit has slits for preventing flux leakage from the permanent magnets. The slits run within projected sections of the permanent magnets along respective circumferential directions thereof, and are extended beyond the projected sections of the permanent magnets at both ends. Since the slits are extended beyond the projected sections of the permanent magnets at both ends, flux leakage from the ends of the permanent magnets to the reluctance type rotor unit is prevented with reliability, thereby avoiding deterioration in characteristics resulting from flux leakage.

The permanent magnet type rotor unit and the reluctance type rotor unit may be given an angle deviation $\delta$ therebetween in the direction of rotation, the angle deviation $\delta$ corresponding to a mechanical angle equivalent to a difference $\theta$ between a current phase value $\theta 1$ at which the permanent magnet type rotor unit generates a maximum torque and a current phase value $\theta 2$ at which the reluctance type rotor unit generates a maximum torque ($\theta=\theta 1-\theta 2$). The reluctance type rotor unit has slits for preventing flux leakage from the permanent magnets, the slits being formed with the angle deviation $\delta$ in a direction of rotation from respective positions symmetric about a center of the salient pole portions. Since the two types of rotor units are coupled to each other with as much a mechanical angle in the direction of rotation as the difference between the current phase values for generating the respective maximum torques, the maximum output toque is achieved for torque improvement. The slits formed with the angle deviation prevent flux leakage from the permanent magnets as well. Besides, the absence of a nonmagnetic material between the rotor units allows compact configuration and cost reduction.

The rotor may include a first reluctance type rotor unit adjoining to the permanent magnet type rotor unit and a second reluctance type rotor unit adjoining to the first reluctance type rotor unit alone. In this case, the first reluctance type rotor unit has slits for preventing flux leakage from the permanent magnets and has no angle deviation from the permanent magnet type rotor unit in the direction of rotation. The first reluctance type rotor unit and the second reluctance type rotor unit are given an angle deviation therebetween in the direction of rotation. The absence of an angle deviation between the permanent magnet type rotor unit and the first reluctance type rotor unit surely prevent flux leakage from the permanent magnets at between the rotor units and avoid deterioration in characteristics. Besides, the absence of a nonmagnetic material allows compact configuration and cost reduction without necessitating a drop in torque for the sake of flux leakage prevention. In addition, the provision of an arbitrary angle deviation between the first and second reluctance type rotor units makes it possible to obtain arbitrary desired torque characteristics such as higher torque and lower vibration.

Another motor according to the invention includes: a rotor including a permanent magnet type rotor unit having a plurality of permanent magnets and a reluctance type rotor unit having a plurality of salient pole portions, the rotor units being coupled to each other in an axial direction; and a stator for generating a field for driving the rotor. Here, a gap dimension between the reluctance type rotor unit and the stator is made smaller than a gap dimension between the permanent magnet type rotor unit and the stator. The permanent magnet type rotor unit which undergoes higher centrifugal distortion due to the provision of the permanent magnets is given the greater gap dimension. Consequently, the permanent magnet type rotor unit and the reluctance type rotor unit are made equal in the limit of rotation speed, thereby allowing higher rotation speed. Since the gap dimension of the permanent magnet type rotor unit has a small influence on torque characteristics and the gap dimension of the reluctance type rotor unit has a great influence on the same, the reluctance type rotor unit exerts a significant effect of improving the torque characteristics. The reluctance type rotor unit thus improves in efficiency.

Another motor according to the invention includes: a rotor including a permanent magnet type rotor unit having a plurality of permanent magnets and a reluctance type rotor unit having a plurality of salient pole portions, the rotor units being coupled to each other in an axial direction; a stator for generating a field for driving the rotor; and one or more bearings for supporting the rotor rotatably. Here, a bearing of great supporting strength out of them is arranged on a side of the permanent magnet type rotor unit. Because of the rational bearing arrangement that the rotor is supported by the bearing of greater supporting strength on the side of the permanent magnet type rotor unit which is high in mass, the rotor is stably supported with compact configuration.

Another motor according to the invention includes: a rotor including a permanent magnet type rotor unit having a plurality of permanent magnets and a reluctance type rotor unit having a plurality of salient pole portions, the rotor units being coupled to each other in an axial direction; and a stator for generating a field for driving the rotor. Here, the permanent magnet type rotor unit is arranged throughout an axial width of the stator. The reluctance type rotor unit is arranged outside the axial width of the stator. Thereby, the q- and d-axis inductances are changed at the end of the permanent magnet type rotor unit. Consequently, the limit of rotation speed due to the generation of induced voltages in the permanent magnet type rotor unit is eliminated to improve the motor in rotation speed characteristics. The design range of rotation speeds is thus expanded for higher maximum rotation speed.

Another motor according to the invention includes: a rotor including a permanent magnet type rotor unit having a plurality of permanent magnets and a reluctance type rotor unit having a plurality of salient pole portions, the rotor units being coupled to each other in an axial direction; and a stator for generating a field for driving the rotor. Here, a plurality of keyways for fixing a rotating shaft to the permanent magnet type rotor unit and the reluctance type rotor unit are arranged so as to make a relative position between the permanent magnet type rotor unit and the reluctance type rotor unit selectable in the direction of rotation, the rotating shaft connecting the rotor to exterior. Torque characteristic requirements are satisfied by selecting the keyways accordingly. Thereby, the motor is used common to a variety of torque characteristic requirements, which allows a reduction in cost.

Another motor according to the invention includes: a rotor including a permanent magnet type rotor unit having a plurality of permanent magnets and a reluctance type rotor unit having a plurality of salient pole portions, the rotor units being coupled to each other in an axial direction; and a stator for generating a field for driving the rotor. Here, the reluctance type rotor unit has notches for forming the salient pole portions in its periphery. The notches are connected at the periphery by a connecting frame including a magnetic saturation part having such a width that magnetic saturation occurs with slight magnetic flux. The periphery of the reluctance type rotor unit is thus made circular with the connecting frame, whereby a medium stirring resistance is eliminated for smooth effective rotation. Besides, there occurs neither bypassing of magnetic flux through the connecting frame nor a drop in efficiency. Even if the permanent magnets at the end of the permanent magnet type rotor unit get chipped, the chips are retained inside the connecting frame and kept from flowing out, thereby precluding adverse effects.

Hybrid type electric vehicles including the foregoing motors is reduced in the amount of magnets at a given identical output as compared to those of magnet types. When the motors are driven reversely, the production of induced voltages is suppressed for lower iron loss. This increases mileage per charge and prevents deterioration and breakage of the power supply batteries and the like.

Fuel-cell electric vehicles including the foregoing motors also offer the same effects.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Hereinafter, a first embodiment of the present invention will be described with reference to FIGS. 1A to 2B.

Figure 1A:
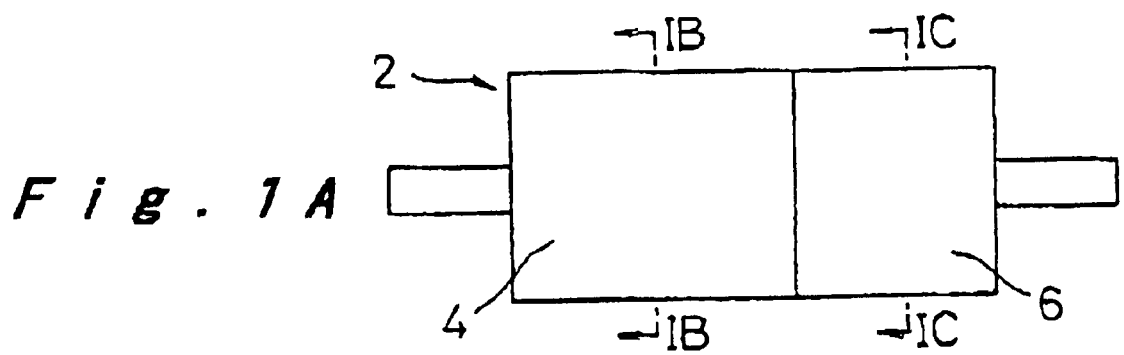
FIG. 1A is a longitudinal sectional view showing the configuration of a motor according to a first embodiment of the present invention.
Figure 1B:
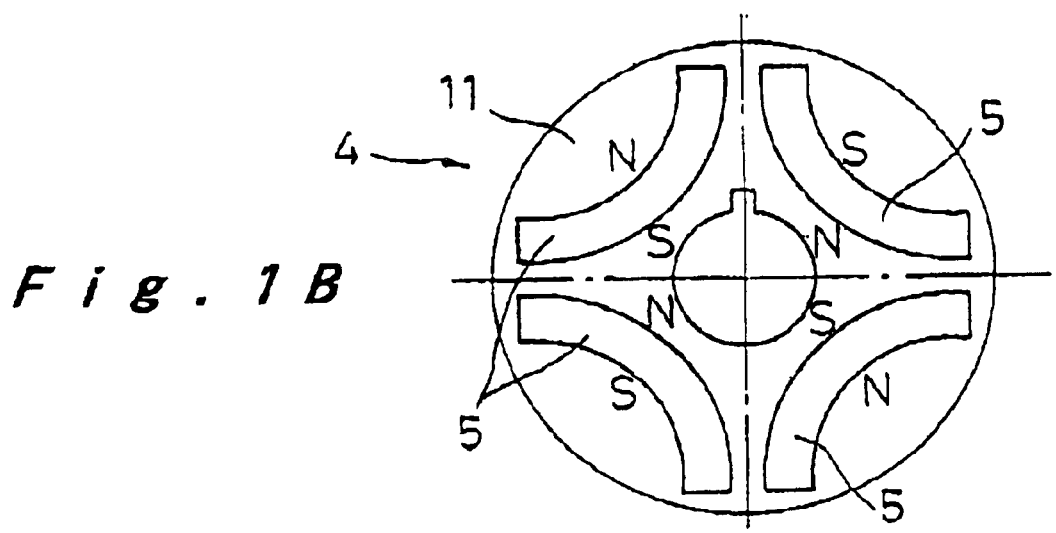
FIG. 1B is a sectional view taken along the arrowed line IB—IB of FIG. 1A.
Figure 1C:
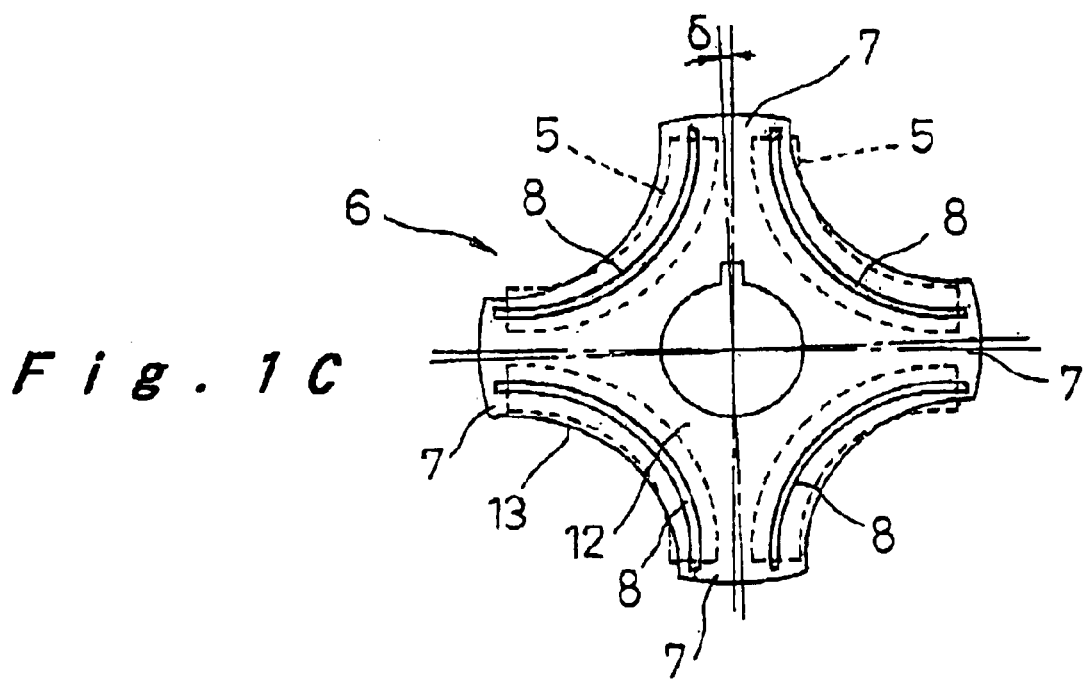
FIG. 1C is a sectional view taken along the allowed line IC—IC of FIG. 1A.

FIG. 1A shows a rotor 2 of a motor 1. The rotor 2 includes a permanent magnet type rotor unit 4 shown in FIG. 1B and a reluctance type rotor unit 6 shown in FIG. 1C. The permanent magnet type rotor unit 4 has four ($2n$; n=2) arc-sectioned permanent magnets 5 such as rare-earth magnets and ferrite magnets, which are embedded in a rotor core 11 with their centers of curvature outward. The permanent magnets 5 are arranged so as to alternate between the N and S poles along the circumferential direction. The reluctance type rotor unit 6 includes a rotor core 12 having four ($2n$; n=2) salient pole portions 7 and notches 13 therebetween.

The rotor 2 is constituted by coupling the permanent magnet type rotor unit 4 and the reluctance type rotor unit 6 to each other so that the permanent magnets 5 and the salient pole portions 7 form electric angles of 90° therebetween with a predetermined angle deviation δ in the direction of rotation. The reluctance type rotor unit 6 has slits 8 for preventing flux leakage from the permanent magnets 5. The slits 8 are formed with the angle deviation δ in the direction of rotation from respective positions symmetric about the center of the salient pole portions 7. The slits 8 are formed into arcs that pass through the centers of the projected sections of the permanent magnets 5 across the axial direction, and have the angle deviation δ from the salient pole portions 7. consequently, while the permanent magnet type rotor unit 4 and the reluctance type rotor unit 6 are coupled with the angle deviation δ therebetween, the slits 8 run along the center lines of the projected sections of the respective permanent magnets 5. The slits 8 are extended beyond the projected sections of the permanent magnets 5 at both ends, so as to prevent flux leakage from the permanent magnets 5. The width of the slits 8 is set at no less than twice the gap dimension between the rotor 2 and a stator 3.

Figure 2A:
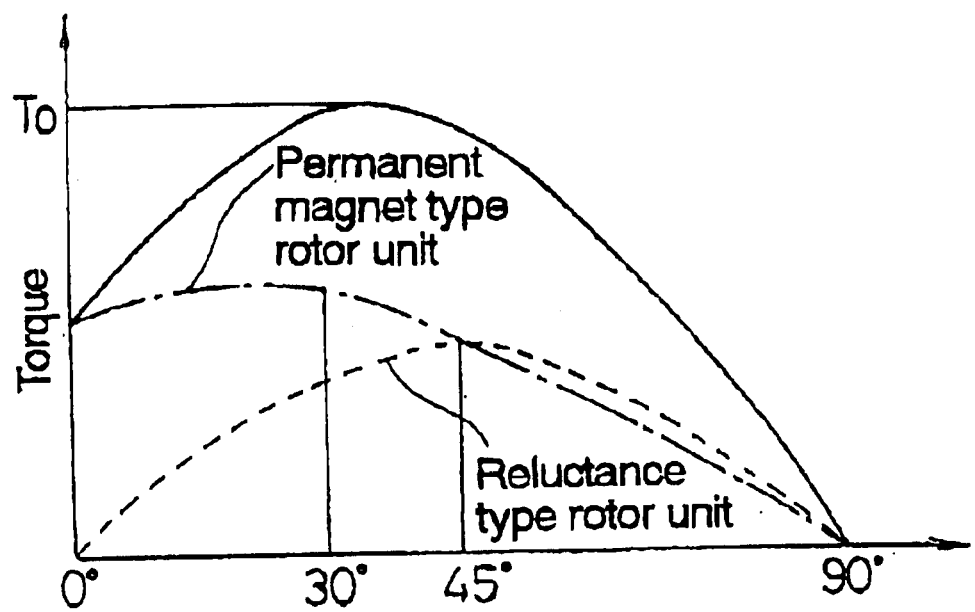
FIGS. 2A and 2B are torque characteristic charts of a conventional example and the present embodiment, respectively, showing motor torque characteristics.
Figure 2B:
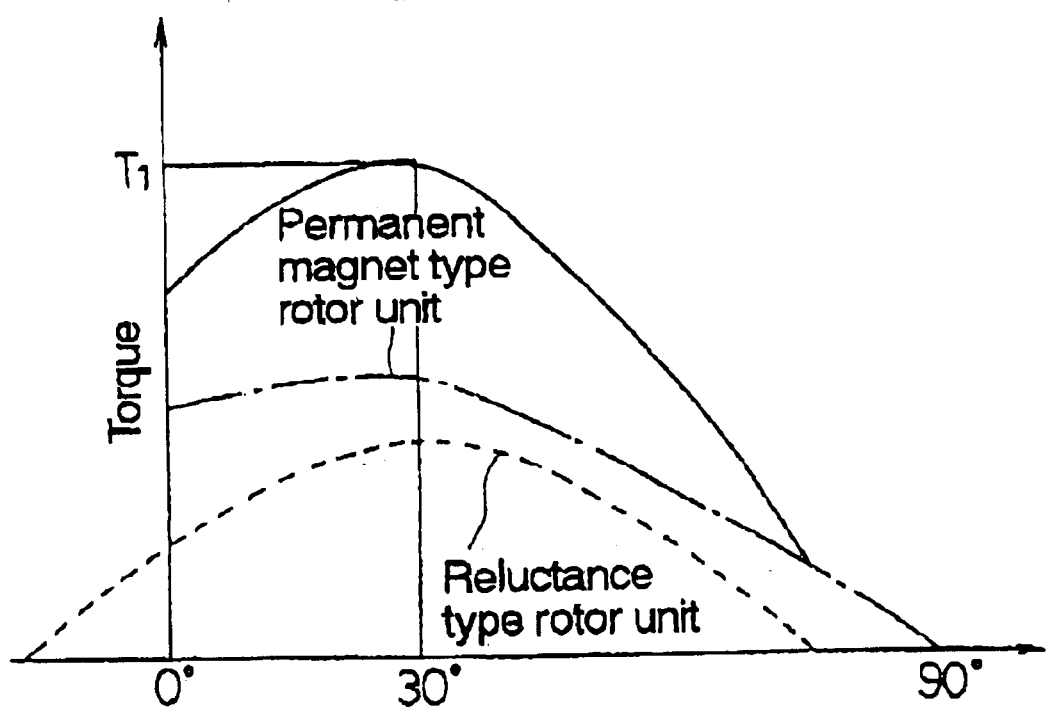

According to the foregoing configuration, the angle deviation in the direction of rotation provided between the permanent magnet type rotor unit 4 and the reluctance type rotor unit 6 yields desired torque characteristics. For example, FIG. 2A shows the case where the permanent magnets 5 and the salient pole portions 7 have electric angles of 90° therebetween. Here, the output torque, given by the sum of the chain-lined torque obtained from the permanent magnet type rotor unit 4 (the sum of a magnet torque and part of a reluctance torque) and the broken-lined torque obtained from the reluctance type rotor unit 6, has a maximum value of $T_0$. FIG. 2B is for situations where the permanent magnet type rotor unit 4 and the reluctance type rotor unit 6 form an angle of 90° plus an angle deviation δ of 15° in electric angle. In this case, the peak value of the torque from the permanent magnet type rotor unit 4 and the peak value of the torque from the reluctance type rotor unit 6 are added to achieve a maximum output torque $T_1$ ($T_1 > T_0$). In addition, the rotor units 4 and 6 of different torque waveforms are adjusted in the angle deviation in the direction of rotation so that torque ripples decrease for lower vibration.

Since the slits 8 are extended beyond the projected sections of the permanent magnets 5 at both ends, flux leakage from the ends of the permanent magnets 5 to the reluctance type rotor unit 6 is prevented, thereby avoiding deterioration in characteristics resulting from flux leakage. In addition, since the slits 8 are formed with an angle deviation δ as described above, the slits 8 prevent flux leakage from the permanent magnets 5 with reliability, thereby avoiding deterioration in characteristics resulting from flux leakage. Unlike the conventional example, a nonmagnetic material is not interposed between the rotor units 4 and 6. This allows compact configuration and cost reduction.

Note that the angle deviation of the slits 8 need not always be set so that the slits 8 run along the centers of the projected sections of the permanent magnets 5. It may be set so that the silts 8 run within the projected sections of the respective permanent magnets 5 when an arbitrary angle deviation is established between the permanent magnet type rotor unit 4 and the reluctance type rotor unit 6.

A nonmagnetic material is preferably arranged in the slits 8. This ensures the prevention of flux leakage and suppresses a drop in strength ascribable to the slits 8.

Now, a second embodiment of the present invention will be described with reference to FIGS. 3 to 5. Characteristic parts of the embodiments to be described below may be either combined with the configuration of preceding embodiments or used by themselves.

Figure 3:
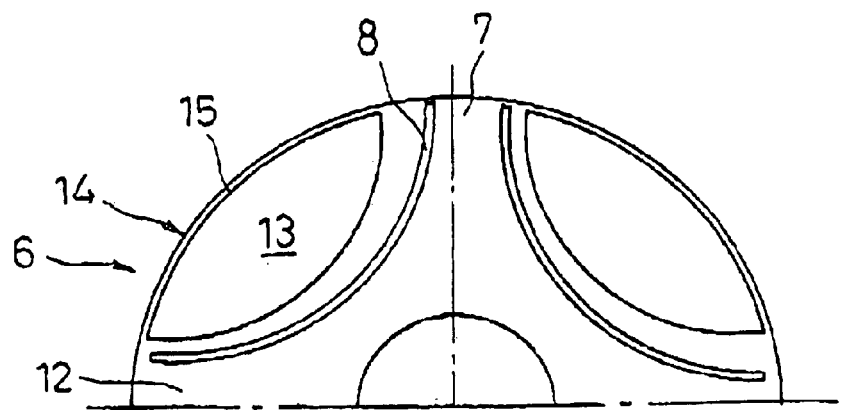
FIG. 3 is a schematic diagram showing a reluctance type rotor unit according to a second embodiment of the invention.

In the present embodiment, as shown in FIG. 3, the reluctance type rotor unit 6 has notches 13 for forming salient pole portions 7 in its periphery. The notches 13 are connected at the periphery by connecting frames 14. Along the entire length, the connecting frames 14 are made of magnetic saturation portions 15 having such a width that magnetic saturation occurs with slight magnetic flux. Incidentally, the magnetic saturation portions 15 may be arranged only in part.

According to the configuration described above, the periphery of the reluctance type rotor unit 6 is made circular by the connecting frames 14. In such cases that the motor 1 is placed in a medium, a medium stirring resistance is thus reduced for smooth rotation. Besides, there occurs neither bypassing of magnetic flux through the connecting frames 14 nor a drop in efficiency.

Consequently, when the motor is applied to one for driving a compressor or the like to be placed in a medium such as a refrigerant, the rotation of the rotor 2 causes no medium stirring. Hence, a drop in efficiency resulting from stirring resistance is suppressed and adverse effects on the medium are precluded. Even if the permanent magnets 5 get chipped at ends, the chips are retained inside the connecting frames 14 and kept from flowing out, thereby eliminating adverse effects.

Figure 4:
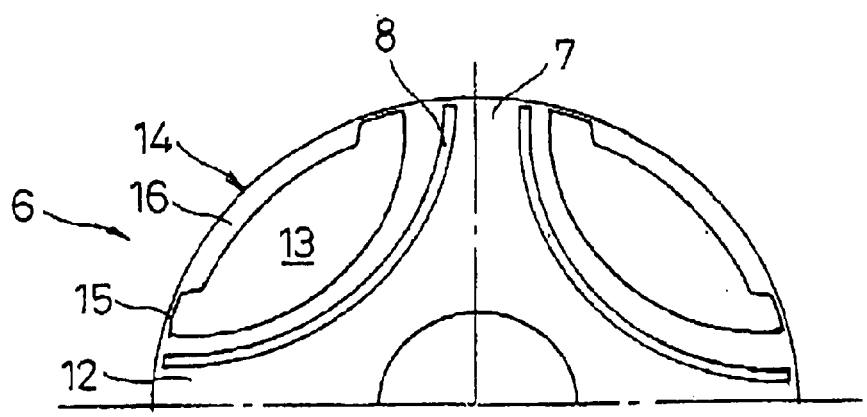
FIG. 4 is a schematic diagram showing a modified example of the reluctance type rotor unit according to the embodiment.

Otherwise, as shown in FIG. 4, the connecting frames 14 may be each provided with magnetic saturation portions 15 at least on both ends and a wide part 16 in the middle. Aside from the foregoing effect, the midsections of the connecting frames 14 can thus secure strength and rigidity by means of the wide parts 16, thereby improving the strength of the rotor 2. It is also possible to improve the durability of the core mold, with a reduction in production cost.

Figure 5:
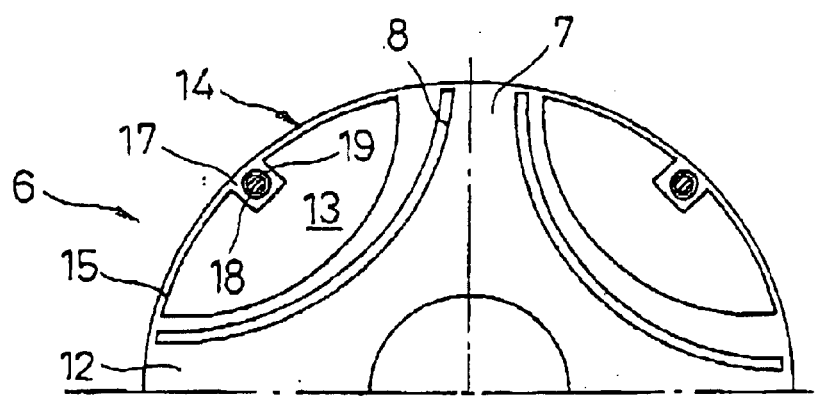
FIG. 5 is a schematic diagram showing another modified example of the reluctance type rotor unit according to the embodiment.

Furthermore, as shown in FIG. 5, the connecting frames 14 may be provided with fastening parts 17 of greater width, having bolt holes 18 for axial fastening/fixing. These fastening parts 17 are fastened and fixed by bolts 19 for a further improvement in the strength of the rotor 2.

Next, a third embodiment of the present invention will be described with reference to FIGS. 6 to 8H.

Figure 6:
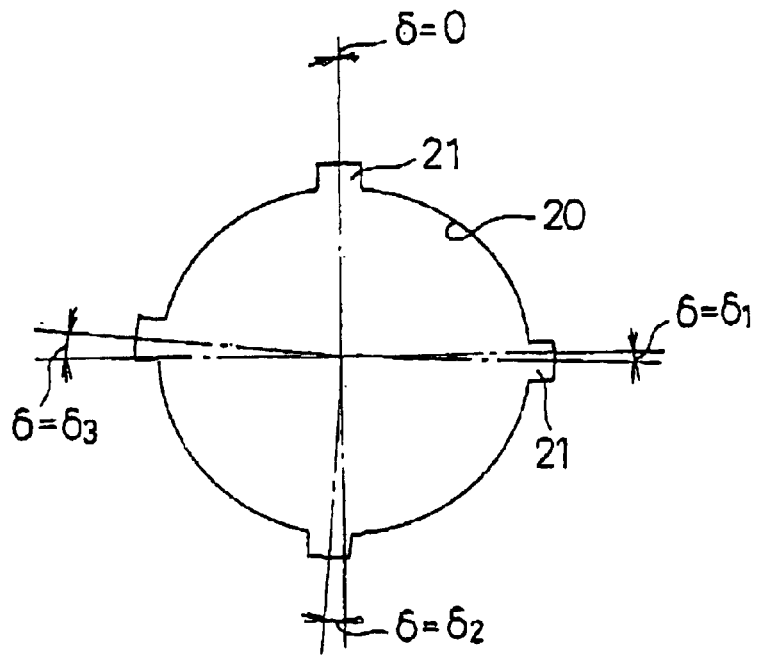
FIG. 6 is a keyway layout according to a third embodiment of the invention.
Figure 7:
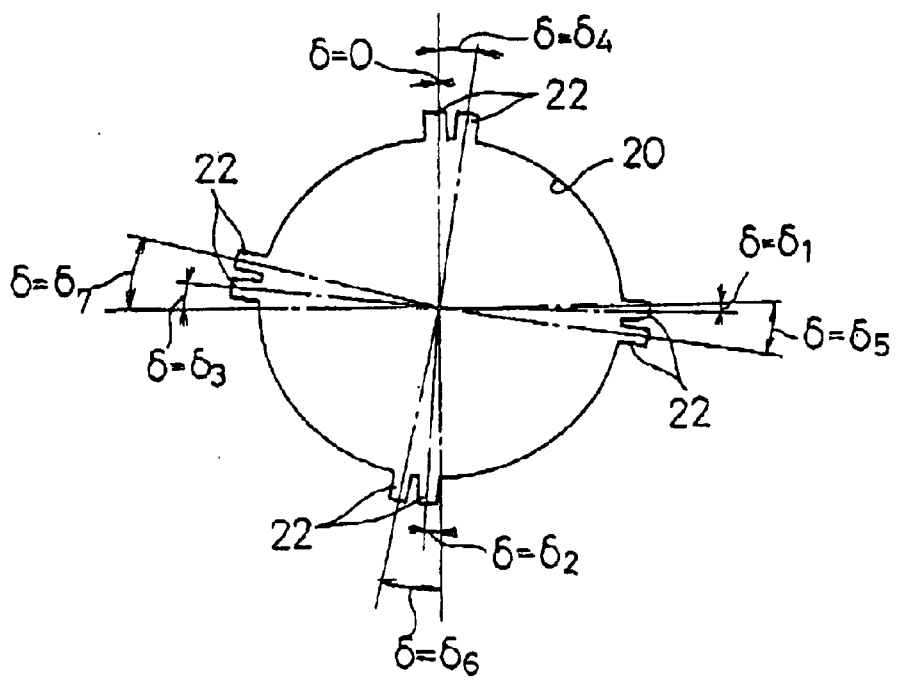
FIG. 7 is a keyway layout of a modified example of the embodiment.

In the present embodiment, as shown in FIG. 6, the permanent magnet type rotor unit 4 and the reluctance type rotor unit 6 have a shaft hole 20 into which a rotating shaft (not shown) for connecting the rotor 2 to exterior is fitted. In order to fix the rotating shaft to the permanent magnet type rotor unit 4 and the reluctance type rotor unit 6, a plurality of keyways 21 are formed in either one or both of the shaft holes 20 in the permanent magnet type rotor unit 4 and the reluctance type rotor unit 6. The plurality of keyways 21 are formed at angle deviations $\delta$ of 0°, $\delta_1$, $\delta_2$, and $\delta_3$ ($\delta_1<\delta_2<\delta_3$) with respect to reference lines drawn at intervals of 180° in electric angle (in the present embodiment, at intervals of 90°), respectively. This makes the relative position (angle deviation) between the permanent magnet type rotor unit 4 and the reluctance type rotor unit 6 selectable in the direction of rotation. Alternatively, as shown in FIG. 7, keyways 22 of relatively small width may be formed around the shaft hole(s) 20 at angle deviations $\delta$ of 0°, $\delta_1$, $\delta_2$, $\delta_3$, $\delta_4$, $\delta_5$, $\delta_6$, and $\delta_7$ ($\delta_1<\delta_2<\delta_3<\delta_4<\delta_5<\delta_6<\delta_7$) with respect to the reference lines. In this case, the range of adjustments in angle deviation is expanded further.

According to the foregoing configuration, the keyways 21 or 22 can be selected to satisfy torque characteristic requirements. The motor is thus used common to a variety of torque characteristic requirements with a reduction in cost.

Figure 8A:
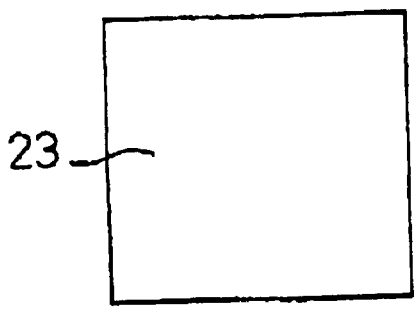
FIGS. 8A to 8H are explanatory diagrams showing various key shapes in the embodiment.

The above-mentioned keyways 21, 22 are preferably different from one another in shape according to angle deviations. For example, FIG. 8A shows a key 23 for fixing the permanent magnet type rotor unit 4. FIGS. 8B to 8H show keys 24 for fixing the reluctance type rotor unit 6. The keys 24 of FIGS. 8B to 8H shall be selected depending on the angle deviation at the fixed position of the reluctance type rotor unit 6 in the direction of rotation. Meanwhile, the keyways 21, 22 in the shaft hole 20 of the reluctance type rotor unit 6 are formed into keyway shapes corresponding to respective angle deviations. This facilitates assembly into a position of an angle deviation suited to desired torque characteristics without fault.

Figure 8B:
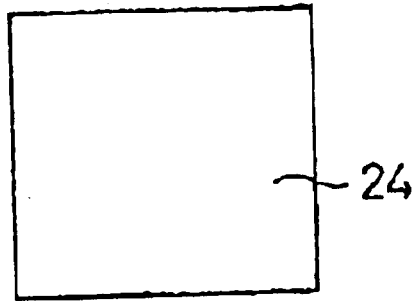
Figure 8C:
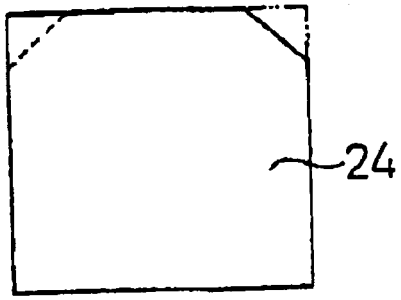
Figure 8D:
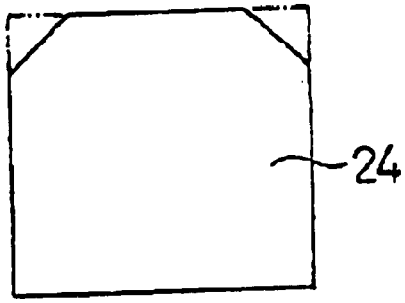
Figure 8E:
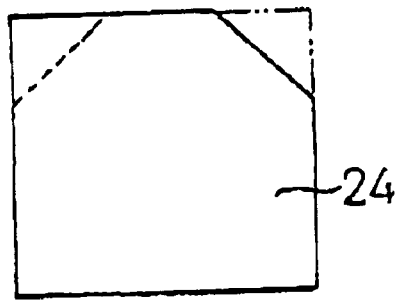
Figure 8F:
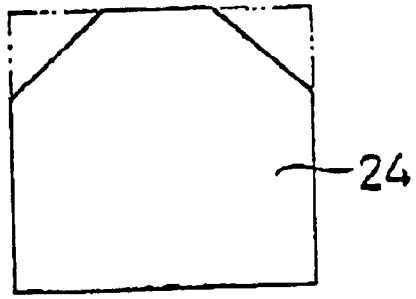
Figure 8G:
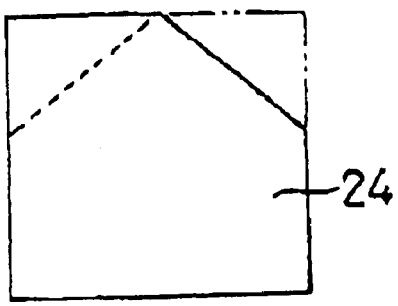
Figure 8H:
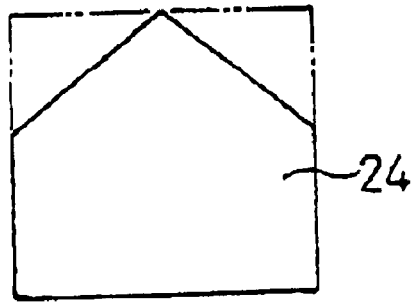

Among the shown examples, FIG. 8B is of a basic shape having a rectangular cross section. FIGS. 8C, 8E, and 8G are ones chamfered at either corner, and FIGS. 8D, 8F, and 8H at both corners, with the amounts of chamfer increased in succession. In this way, one of the plurality of keyways 21, 22 is formed into the basic shape shown in FIG. 8B, and the rest of the keyways 21, 22 are formed into the shapes shown in FIGS. 8C to 8H, different at least in part from the basic shape. This allows commonality of keys 24 and requires partial machining alone to achieve the various shapes, thereby contributing a reduction in cost.

Figure 9:
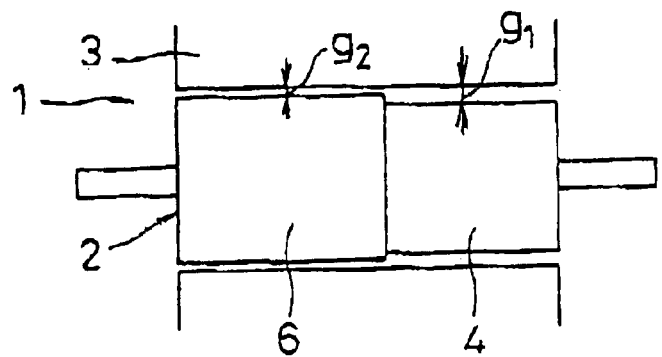
FIG. 9 is a schematic diagram showing a motor according to a fourth embodiment of the invention.

Next, a fourth embodiment will be described with reference to FIG. 9.

In the present embodiment, a gap dimension $g_2$ between the reluctance type rotor unit 6 and the stator 3 is set smaller than a gap dimension $g_1$ between the permanent magnet type rotor unit 4 and the stator 3.

According to the present embodiment, the permanent magnet type rotor unit 4 which undergoes higher centrifugal distortion due to the provision of the permanent magnets 5 is given the greater gap dimension $g_1$. Consequently, the permanent magnet type rotor unit 4 and the reluctance type rotor unit 6 are made equal in the limit of rotation speed, thereby allowing higher rotation speed. Since the gap dimension $g_1$ of the permanent magnet type rotor unit 4 has a small influence on torque characteristics and the gap dimension $g_2$ of the reluctance type rotor unit 6 has a great influence on the torque characteristics, the reluctance type rotor unit 6 exercises a significant effect of improving the torque characteristics. The reluctance type rotor unit 6 improves in efficiency accordingly, with an improvement in motor efficiency.

Since the slits 8 formed in this reluctance type rotor unit 6 are given a slit width no less than twice the gap dimension $g_1$ between the permanent magnet type rotor unit 4 and the stator 3, the slits 8 creates gaps greater than $2g_1$, or the total length of the gaps lying on the original magnetic paths of the permanent magnets 5, on the magnetic paths of leakage flux. Thus, the slits 8 surely exercise the effect of preventing flux leakage.

Figure 10:
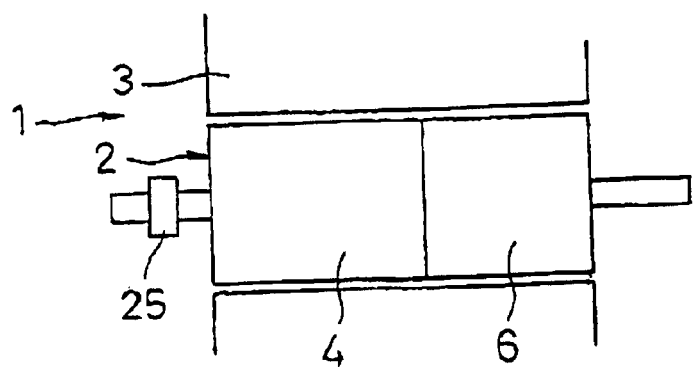
FIG. 10 is a schematic diagram showing a motor according to a fifth embodiment of the invention.

Next, a fifth embodiment will be described with reference to FIG. 10.

The present embodiment provides at least one bearing 25 for supporting the rotor 2 rotatably. The bearing 25, or a bearing 25 of greater supporting strength if a plurality of magnets are provided, is arranged on the side of the permanent magnet type rotor unit 4. In the shown example, a single bearing 25 is arranged on the side of the permanent magnet type rotor unit 4. When bearings 25 are arranged on both sides, the one arranged on the side of the permanent magnet type rotor unit 4 shall be greater in size and in supporting strength.

According to the present embodiment, the rotor 2 is stably supported with compact configuration because of the rational bearing arrangement that the rotor 2 is supported by a bearing 25 of greater supporting strength on the side of the permanent magnet type rotor unit 4 which is high in mass.

Figure 11:
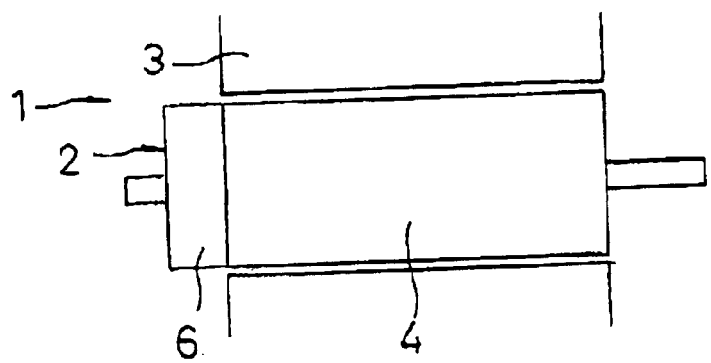
FIG. 11 is a schematic diagram showing a motor according to a sixth embodiment of the invention.

Next, a sixth embodiment will be described with reference to FIG. 11.

In the present embodiment, the permanent magnet type rotor unit 4 is arranged throughout the axial width of the stator 3. The reluctance type rotor unit 6 is placed outside the axial width of the stator 3. Such configuration allows the q- and d-axis inductances to be changed at the end of the permanent magnet type rotor unit 4, with an increase in rotation speed.

Figure 12:
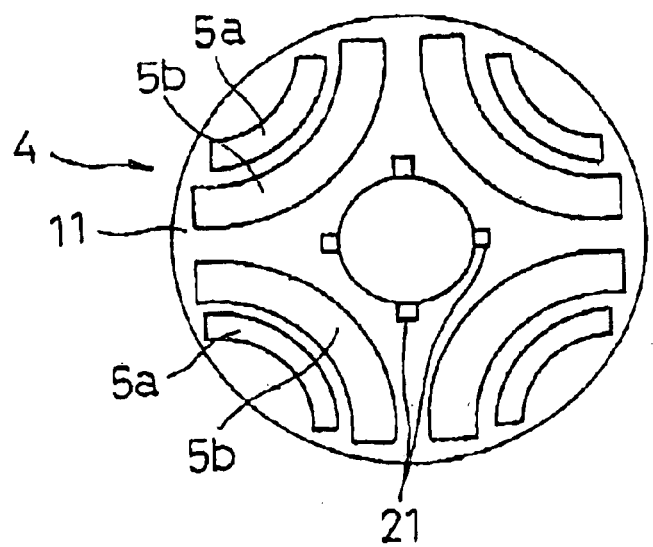
FIG. 12 is a schematic diagram showing a motor according to a seventh embodiment of the invention.

Next, a seventh embodiment will be described with reference to FIG. 12. The foregoing first embodiment has dealt with the case where the permanent magnet type rotor unit 4 has the plurality of permanent magnets 5 arranged radially in a single layer. In the present embodiment, outer permanent magnets 5a and inner permanent magnets 5b are arranged radially in double layers so that the permanent magnet type rotor unit 4 also forms magnetic paths between the permanent magnets 5a and 5b to obtain a reluctance torque. Even in the motor 1 having such a permanent magnet type rotor unit 4, the reluctance type rotor unit 6 may be provided with slits 8 for the sake of the same effects.

Figure 13:
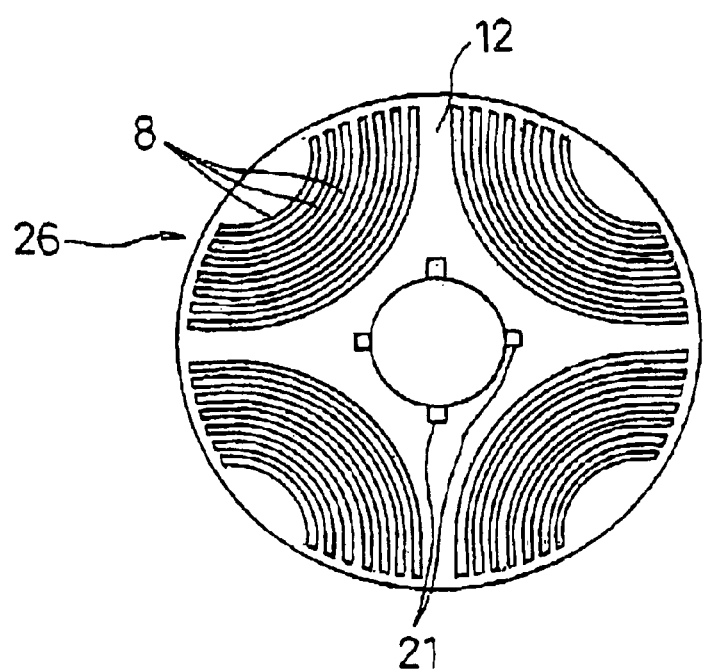
FIG. 13 is a schematic diagram showing a motor according to an eighth embodiment of the invention.

Next, an eighth embodiment will be described with reference to FIG. 13. The foregoing third embodiment has dealt with the case where a plurality of keyways 21 having different angle deviations are formed in the reluctance type rotor unit 6 having a plurality of salient pole portions 7. In the present embodiment, as shown in FIG. 13, a plurality of keyways 21 having different angle deviations are formed in a rotor 26 of a synchronous motor so that the keyways 21 can be selected to allow a phase selection/adjustment. Consequently, the synchronous motor also offers the same effects.

Figure 14:
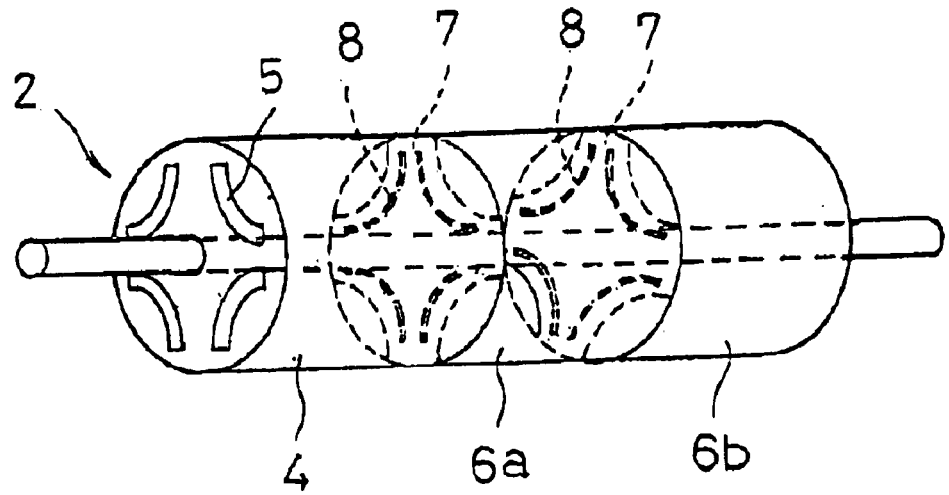
FIG. 14 is a schematic diagram showing a motor according to a ninth embodiment of the invention.

Next, a ninth embodiment will be described with reference to FIG. 14. The foregoing embodiments have dealt with the cases where the rotor 2 is composed of a permanent magnet type rotor unit 4 and a single reluctance type rotor unit 6 which are directly connected in the axial direction, and the permanent magnet type rotor unit 4 and the reluctance type rotor unit 6 have an angle deviation therebetween. In the present embodiment, the rotor 2 is composed of the permanent magnet type rotor unit 4, a first reluctance type rotor unit 6a adjoining thereto, and a second reluctance type rotor unit 6b adjoining to the first reluctance type rotor unit 6a. The first reluctance type rotor unit 6a has slits 8 for preventing flux leakage from the permanent magnets 5 but no angle deviation from the permanent magnet type rotor unit 4 in the direction of rotation. For desired torque characteristics, the first reluctance type rotor unit 6a and the second reluctance type rotor unit 6b are given an appropriate angle deviation therebetween in the direction of rotation.

According to the present embodiment, the absence of an angle deviation between the permanent magnet type rotor unit 4 and the first reluctance type rotor unit 6a surely prevents flux leakage from the permanent magnets 5 at between the rotor units 4 and 6a, thereby avoiding deterioration in characteristics. Besides, the absence of a nonmagnetic material therebetween allows compact configuration and cost reduction without necessitating a drop in torque for the sake of flux leakage prevention. In addition, the provision of an arbitrary angle deviation between the first and second reluctance type rotor units makes it possible to obtain desired torque characteristics such as higher torque and lower vibration.

Incidentally, in the present embodiment, the second reluctance type rotor unit 6b may be the rotor 26 of a synchronous motor as shown in the eighth embodiment of FIG. 13. Such combination of reluctance type rotor units having different torque waveform characteristics further reduces torque ripples, thereby achieving lower vibration. While the present embodiment deals with the case of combining a single permanent magnet type rotor unit 4 with two reluctance type rotor units 6a and 6b, any numbers of rotor units may be combined with each other.

Figure 15:
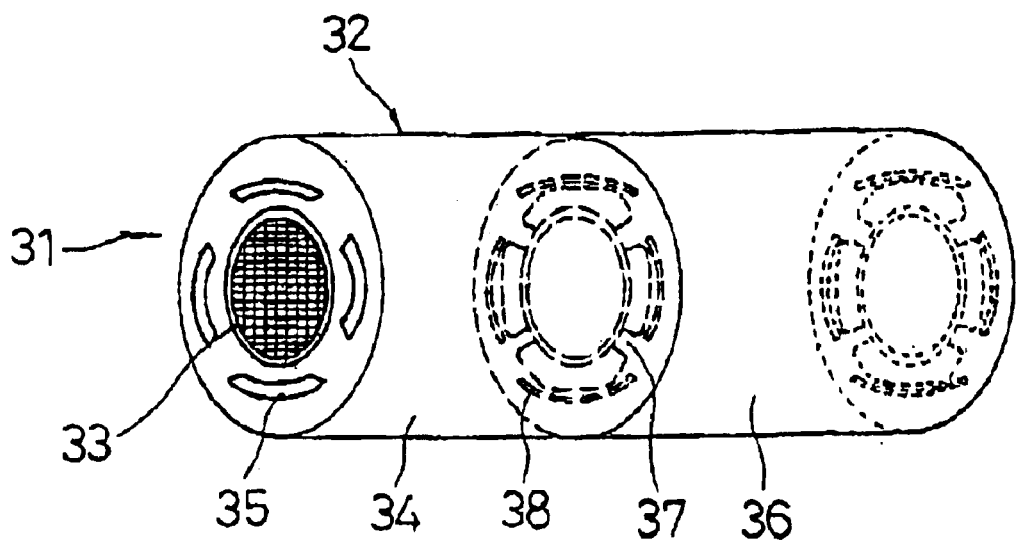
FIG. 15 is a schematic diagram showing a motor according to a tenth embodiment of the invention.
Figure 16A:
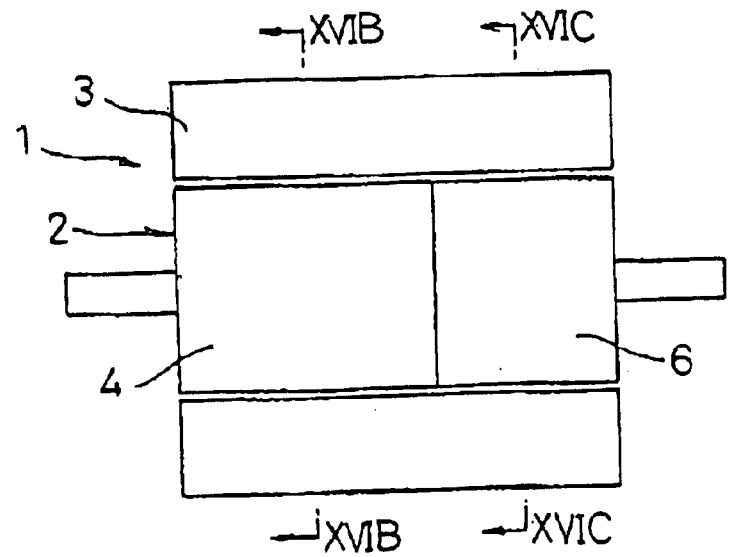
FIG. 16A is a longitudinal sectional view showing a configuration example of a conventional motor.
Figure 16B:
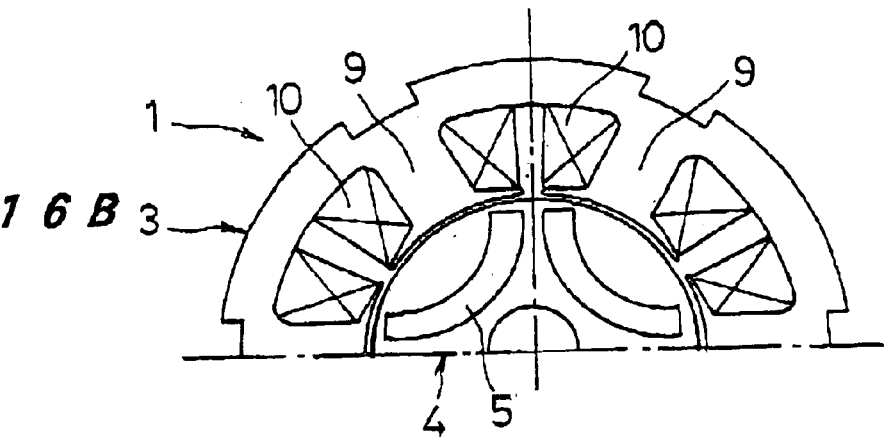
FIG. 16B is a sectional view taken along the arrowed line XVIB—XVIB of FIG. 16A.
Figure 16C:
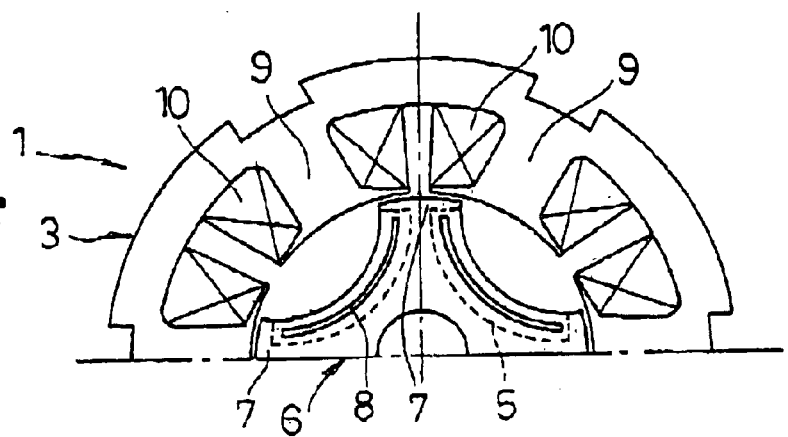
FIG. 16C is a sectional view taken along the allowed line XVIC—XVIC of FIG. 16A.

Next, a tenth embodiment will be described with reference to FIG. 15. The foregoing embodiments have dealt with the cases where the present invention is applied to an inner rotor type motor. The present embodiment, as shown in FIG. 15, is an outer rotor type motor 31 which has a rotor 32 rotatably arranged around a stator 33. The rotor 32 is composed of a permanent magnet type rotor unit 34 having a plurality of permanent magnets 35 and a reluctance type rotor unit 36 having a plurality of salient pole portions 37. The rotor units 34 and 36 are coupled with an angle deviation therebetween in the direction of rotation. Slits 38 for preventing flux leakage from the permanent magnets 35 are formed in the reluctance type rotor unit 36 with the angle deviation.

Even in such an outer rotor type motor 31, the application of the present invention offers the same operation and effects as in the foregoing embodiments.

The motors 1, 31 of the foregoing embodiments are compact in size, high in output, and high in efficiency, and thus are suitably applicable to the compressor-driving motor shown in the second embodiment. In addition, the motors 1, 31 may be suitably applied to the driving motors in hybrid, fuel-cell, and other types of electric vehicles, and the driving motors of high-power fans.

In particular, hybrid type electric vehicles incorporating the foregoing motors 1, 31 achieve higher outputs because of the reluctance torque as compared to hybrid type electric vehicles using conventional magnet type motors. Given the same motor output, when the motors are deactivated and rotated by the engines during braking, downslope, and so on, the production of induced voltages is suppressed to lower iron loss since the rotor units contain smaller amounts of magnets. As a result, the hybrid type electric vehicles are increased in mileage per charge. Besides, even when the vehicles are running at high speed with the motors stopped, i.e., on the outputs of the engines alone, it is possible to lower the voltage generated by the high speed rotations of the motors, thereby preventing degradation and breakage of the power supply batteries and the like because the rotor units contain smaller amounts of magnets.

The same effects are also obtained from fuel-cell electric vehicles.

According to the motor of the present invention, flux leakage from the ends of the permanent magnets of the permanent magnet type rotor unit to the reluctance type rotor unit(s) is prevented to avoid deterioration in characteristics resulting from flux leakage. Also, desired torque characteristics such as higher torque and lower vibration are achieved.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:
1. A motor, comprising:
    a rotor including a permanent magnet type rotor unit having a plurality of permanent magnets and a reluctance type rotor unit having a plurality of salient pole portions, said rotor units being coupled to each other in an axial direction; and
    a stator that generates a field for driving said rotor,
    said reluctance type rotor unit having slits that prevent flux leakage from said plurality of permanent magnets, each of said slits having a substantially smaller width than a width of one of the plurality of permanent magnets and running within projected sections of the plurality of permanent magnets projected along the axial direction, along respective circumferential directions thereof, said slits extending beyond said projected sections at both ends.

2. The motor according to claim 1, further comprising a nonmagnetic material arranged in said slits.

3. The motor according to claim 1, wherein said rotor is rotatably arranged around said stator and is cylindrical in shape.

4. A hybrid type electric vehicle comprising the motor according to claim 1.

5. A fuel-cell electric vehicle comprising the motor according to claim 1.

6. A motor, comprising:

a rotor that includes a permanent magnet type rotor unit having a plurality of permanent magnets and a reluctance type rotor unit having a plurality of salient pole portions, said rotor units being coupled to each other in an axial direction; and a stator that generates a field for driving said rotor, said reluctance type rotor unit having a plurality of slits, wherein the plurality of slits extend beyond projected sections of the plurality of permanent magnets at both ends and wherein the width of each of the plurality of slits is smaller than a width of each of the projected sections of the plurality of permanent magnets.

7. The motor according to claim 6, further comprising a nonmagnetic material arranged in the plurality of slits.

8. The motor according to claim 6, wherein said rotor is rotatably arranged around said stator and is cylindrical in shape.

9. A hybrid type electric vehicle comprising the motor according to claim 6.

10. A fuel-cell electric vehicle comprising the motor according to claim 6.

11. The motor according to claim 6, wherein the plurality of slits run along a center of the projected sections of the plurality of permanent magnets.

* * * * *